UNITED STATES PATENT OFFICE.

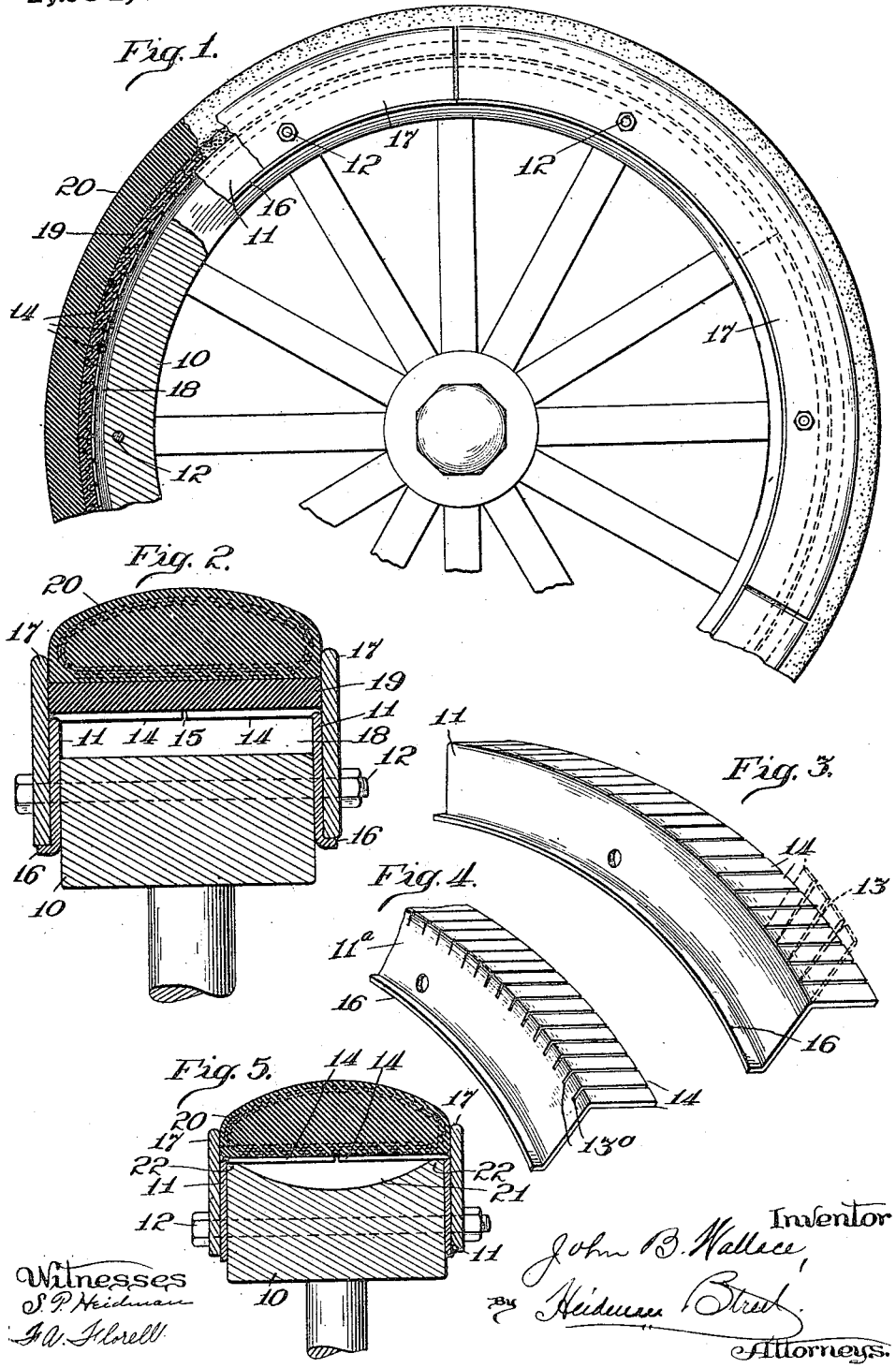
J. B. WALLACE.
TIRE.
APPLICATION FILED OCT. 11, 1916.
1,284,832. Patented Nov. 12, 1918.

JOHN B. WALLACE, OF MUKWONAGO, WISCONSIN.

TIRE.

1,284,832.

Specification of Letters Patent. Patented Nov. 12, 1918.

Application filed October 11, 1916. Serial No. 124,926.

*To all whom it may concern:*

Be it known that I, JOHN B. WALLACE, a citizen of the United States, and a resident of Mukwonago, in the county of Waukesha and State of Wisconsin, have invented certain new and useful Improvements in Tires, of which the following is a description, reference being had to accompanying drawing, which forms a part of my specification.

My invention relates to tires for automobiles and the like, and has for its object the provision of a tire-structure which will readily accommodate itself to the unevenness of the roadway; a tire devised to compensate for shock and vibration, without the use of air-chambers or air-casings, and therefore, a construction which eliminates the annoyances encountered with pneumatic tires as a result of the air-casings becoming ruptured or punctured; while at the same time providing the desired resiliency.

The invention and the advantages thereof will be more fully comprehended from the following detailed description of the accompanying drawing, wherein:—

Figure 1 is a partial side elevation and sectional view of a portion of a wheel provided with my improved tire.

Fig. 2 is a cross sectional view of the tire and felly of the wheel.

Fig. 3 is a detail perspective view of a portion of the flexible metallic means of the tire.

Fig. 4 is a perspective view of a modified form of the metallic means disclosed in Fig. 3.

Fig. 5 is a cross sectional view of a modified form of tire.

The wheel may be of the usual construction at present employed, with the felly 10 provided with metallic plates or members 11 secured on each side of the felly, as shown in Fig. 2, and held in place by means of the bolts 12 passing at suitable intervals through the felly of the wheel.

The plates 11 are preferably formed in the nature of segments, as shown in Fig. 3; a suitable number of segments being employed commensurate with the circumference of the wheel so as to encircle the entire felly, as shown in Fig. 1. The plates or members 11 are formed of sheets of steel having the desired flexibility and cut to proper width, so as to provide an angular member, as shown. A portion of the plate, on one side of the longitudinal center line, is provided with interstices or slightly V-shaped slits as shown at 13 in the phantom portion of Fig. 3, so as to provide a series of separated portions or prongs 14. After the member or plate 11 has been intersticed, as shown and described, the plate is then bent longitudinally into the angle formation shown in Fig. 3 so as to have the intersticed portion disposed substantially at right angles to the integral main portion of the plate or member. The members or plates are slit in the V-shape manner shown in dotted lines in Fig. 3, so that the various prongs or portions will have their sides disposed substantially parallel with each other when the plate has been bent in the angular manner and given the arcuate formation shown in Fig. 3.

The plates or members on opposite sides of the felly 10 are identical in construction and the intersticed or slit portions of such width as to provide a small space, as shown at 15 in Fig. 2, between the prongs or separated portions 14 of the opposite plate-members so as to allow movement of the prongs or separated portions of the plate-member on one side of the felly without interference with the prongs or separated portions of the opposing plate-member.

In order to insure the plate-members 11 being maintained in proper relation with the felly of the wheel, especially where each plate-member is held by a single bolt to the felly, as shown, I have shown the plate-members 11 provided with the outwardly presented flange 16 on the lower edge of the base-portion thereof. This flange 16 is adapted to engage with the inner circumference of the segmental outer plates 17, 17 which latter are held in place by the same bolts 12, previously described; the plates 17, however, being preferably of greater length than the plate-members 11 so as to overlap adjacent plate-members 11, as indicated in dotted lines in Fig. 1. The outer plates 17 are preferably of sufficient length to enable the members 17 to be held in place by two bolts or rather the bolts of adjacent plate-members 11. It will be understood, of course, that the wheel may be provided with any suitable number of bolts so that more than one bolt may be provided for each segmental plate-member 11; the construction shown in the drawing being applied to the present type of automobile wheel, with the same number of bolts at present used for securing the demountable rim in place, and employed to demonstrate the adaptability of my tire to wheels originally constructed for the demountable pneumatic tires now in use.

The plate-members 11, which may be of any suitable length, are circumferentially disposed about opposite sides of the felly 10, so as to leave a space between the felly 10 and the overlapping spring prong-portions of the plates, as shown at 18 in Fig. 2, so as to permit the flat spring portions or prongs to be depressed through the action of any impacts or blows imparted to the tread of the wheel.

After the segmental members 11 have been put into place, a band or layer of resilient live rubber, indicated at 19 in Fig. 2, is then placed about the intersticed or prong-portions of the plates; the band 19 being of a suitable thickness and held in place by the side plates 17, 17. The side plates 17 are made of a width to not only cover the body or vertically disposed portion of members 11 and sides of the cushion member or band 19, but also to extend slightly beyond the band of live rubber 19 and in engagement with the sides of the resilient tread member 20 which is composed of rubber and provided with layers of suitable fabric vulcanized therein; the tread 20 being similar in construction to the treads of the outer casings of pneumatic automobile tires, as at present employed.

With the construction shown and described, impacts or blows applied at any point on the tread 20 will not only be taken up by the resiliency of the tread and the live rubber cushion or band 19, but will also be taken care of by the yielding flexible portions 14 of the members 11, which will flex toward the felly 10 of the wheel by reason of the intervening space shown at 18.

In Fig. 4 I show a slightly modified form of the segmental members 11. In this construction the plate-members 11ª are slit in the manner previously described, except that the interstices are cut, to a point slightly beyond the point where the plate-members are intended to be bent longitudinally to provide the angular formation. In this construction, the slits 13ª are provided in the vertically disposed portions of the plate-members and thereby provide increased flexibility. The plate-members 11ª, in other respects, however, are similar to those previously described, and are intended to be secured to the felly of a wheel in a similar manner.

The slits in the horizontally disposed portion of the plate-members 11 and 11ª are preferably so made that when the plate-members are given the arcuate formation shown, commensurate with the circumference of the wheel to which they are to be secured, the adjacent sides of the prongs 14 will extend parallel with each other, as shown in Figs. 3 and 4.

In Fig. 5, I show a modification of my invention, wherein the cushion or band of live rubber 19 has been omitted and the resilient tread-member 20 placed immediately upon the plate-members 11, which are formed like the plate-member disclosed in Fig. 3.

The construction shown in Fig. 5 is more especially intended for use on heavy trucks. The felly 10 of the wheel, in this construction, is provided with a channel 21, extending entirely about the outer periphery of the felly and preferably of the concave formation shown in the figure so as to provide circumferential shoulders 22 at the sides of the felly arranged in supporting relation with the horizontally disposed portions or prongs 14 of the plate members adjacent the vertically disposed portions of the members 11; the yielding portions 14, however, being permitted to flex toward the felly by reason of the channel or groove 21.

The construction in Fig. 5, like the previously described construction, is also preferably provided with the side plates or members 17, similar to the plates 17 previously described, and bolted on the sides of the felly 10 by means of the bolts 12, thereby also clamping the members 11 in place.

The construction illustrated in the drawing is so formed as to permit the same to be readily applied to automobile wheels as at present employed without requiring any alterations in the wheel-proper, but it will be readily understood that the segmental plates or members 11 may be of different lengths so as to require either a lesser or greater number of segmental plates than illustrated in the drawing, and other modifications may be made in details of construction without, however, departing from the spirit of the invention.

What I claim is:—

1. A tire, comprising, in combination with a felly of a wheel, a series of angular metallic members secured on both sides of the felly with transversely disposed portions in spaced relation with the outer perimeter of the felly, the transversely disposed portions extending to a point in proximity to the longitudinal center line of the felly and provided with slots extending transversely of said portions so as to provide independently yielding portions, a pad of rubber of comparatively great flexibility secured about the transversely extending portions of said metallic members, a resilient outer tread portion secured about said rubber pad, and means whereby the metallic members, rubber pad and outer tread are maintained in proper relation with each other.

2. In combination with the felly of a wheel, members of flexible sheet metal bent into angular formation and secured to both sides of the felly so as to have one side or portion of the angular member disposed transversely of the felly in opposite directions to a point in proximity to the longitudinal center line of the felly, the transversely disposed portions of the opposing members being slit transversely at short equidistances apart so as to provide a plurality of flat flexible portions or prongs, the relation between the flexible portions and the wheel felly being such as to permit said portions to flex toward the felly, a pad of rubber of comparatively great resiliency disposed circumferentially about the transversely extending portions of said metallic members, a resilient outer tread portion disposed about said pad, and side plates secured to both sides of the felly so as to overlap the metallic members, the flexible pad and said outer tread to maintain the same in place.

3. A tire, comprising, in combination with the felly of a wheel, flexible sheet metal members, angular in cross-section, secured to both sides of the felly so as to have one side of the angular members disposed transversely of the felly in opposite directions, the transversely disposed portions of said members being slit transversely at short distances apart so as to provide a plurality of flat flexible prongs, with the relation between said prongs and the wheel-felly such as to permit said prongs to flex toward the felly, a pad of rubber of comparatively great resiliency disposed circumferentially about the transversely disposed portions of said metallic members, a resilient outer tread portion disposed about said pad, and means disposed along the sides of the wheel-felly whereby said tread portion, pad and metallic members are secured in place.

JOHN B. WALLACE.

Witnesses:
 CHAS. F. HUNTER,
 I. F. WEIR.

Copies of this patent may be obtained for five cents each, by addressing the "Commissioner of Patents, Washington, D. C."